Oct. 25, 1960  J. H. LEWIS ET AL  2,957,533
MATERIALS HANDLING TRUCKS
Filed Dec. 18, 1957  4 Sheets-Sheet 4

INVENTOR.
John H. Lewis
BY Wilbur L. Shefield
Emery, Whittemore, Sandoe & Ely
ATTORNEYS.

2,957,533

MATERIALS HANDLING TRUCKS

John H. Lewis, Dover, and Wilbur L. Sheffield, Westwood, Mass., assignors to Lewis-Shepard Company, Watertown, Mass., a corporation of Massachusetts Filed Dec. 18, 1957, Ser. No. 703,634

5 Claims. (Cl. 180—6.48)

This invention relates to materials handling trucks and particularly to power driven fork lift trucks. Such trucks carry an elevatable fork on their front ends which, in use, is moved under the goods to be moved, then raised to lift the goods which may then be transported from one place to another and stacked.

In such trucks the elements of stability, accessibility of drive units for service and repair, distribution of weight, and maneuverability are all features of importance. Maneuverability is extremely important in order that the trucks may operate within aisles of minimum width. It has been found that these features may be accomplished to good advantage in so-called rear wheel drive trucks in which the truck is supported on three wheels, two of which, preferably spaced apart at the front or fork end of the truck, rotate freely on a fixed axle, and the other of which, located at the rear of the truck is a drive and steer wheel. That is, it is connected to a suitable motor for driving the truck, and the wheel and motor are mounted together in a steering head which is rotatable on a vertical axis for steering the truck. The steering head is usually rotatable through an angle of at least 180° and with this arrangement, the trucks are highly maneuverable, having a turning radius which may even be slightly less than the length of the truck.

While this arrangement has been found to be extremely useful, its use has been limited to trucks of relatively small size and capacity, for when it is sought to use this arrangement for heavier trucks adapted for lifting heavier loads, the size of the single drive and steer wheel had to be increased beyond feasible limits.

It is an object of the present invention to overcome this difficulty by providing a steering head having a pair of closely spaced, independently driven drive and steer wheels, which, in effect, have all of the advantages of a single drive and steer wheel with respect to short turning radius and maneuverability. But since the load is divided equally between the wheels, they may be kept to reasonable size.

It is a further object of the invention to provide a suspension for said wheels adapted to the requirements of use of such trucks.

Other objects and advantages of the invention will appear hereinafter.

A preferred embodiment of the invention selected for purposes of illustration is shown in the accompanying drawings, in which, Figure 1 is a perspective view of a fork lift truck.

Figure 1:
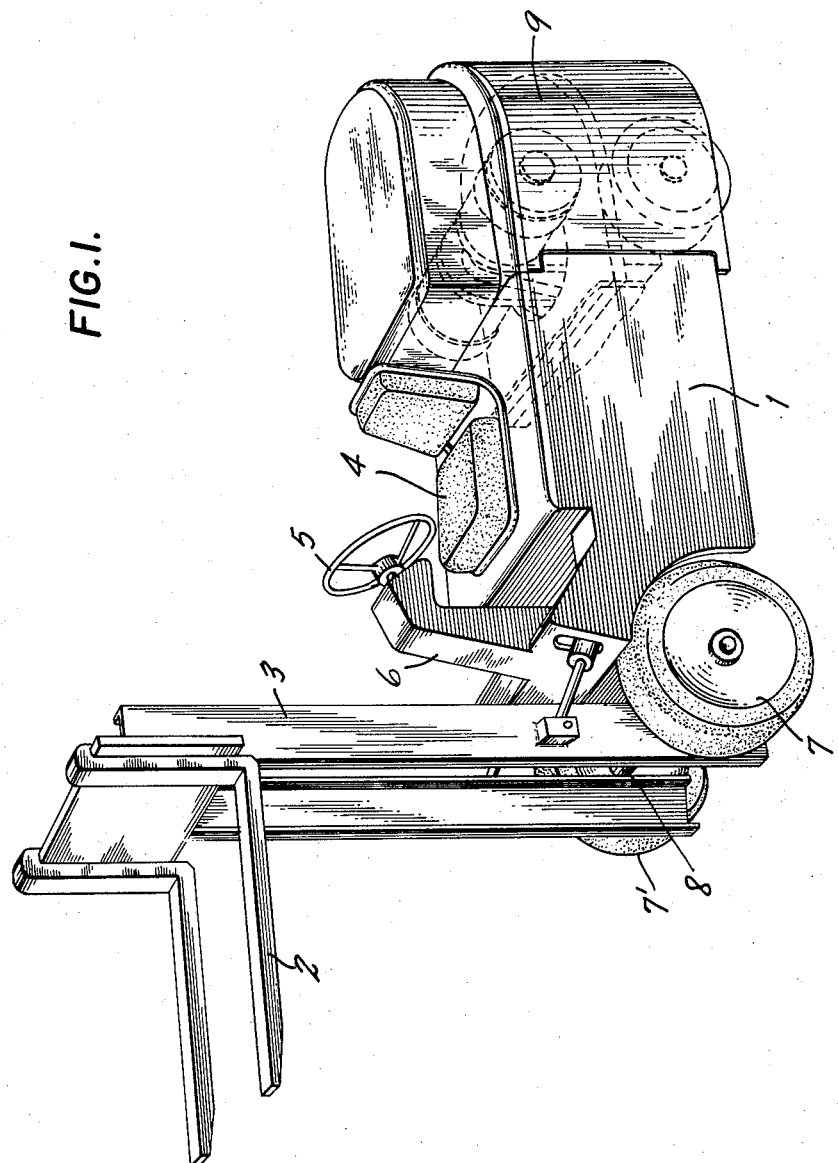

Referring to the drawings, as shown in Fig. 1, the truck body comprises an enclosed compartment 1 which contains batteries and hydraulic mechanisms for operating the fork 2 and for tilting its supports 3. The details of the fork and its operating mechanisms are not shown since they form no part of the present invention.

A driver's seat 4 is located on top of the battery compartment 1 in convenient reach of the steering wheel 5 mounted on post 6. Suitable shaft connections from the steering wheel extend through the post 6 for rotating the steering head as hereinafter described. Suitable pedals, not shown, are also provided for controlling the operation of the truck. The front end of the truck body is supported on a pair of wheels 7, 7' which turn freely on fixed axle 8.

Figure 4:
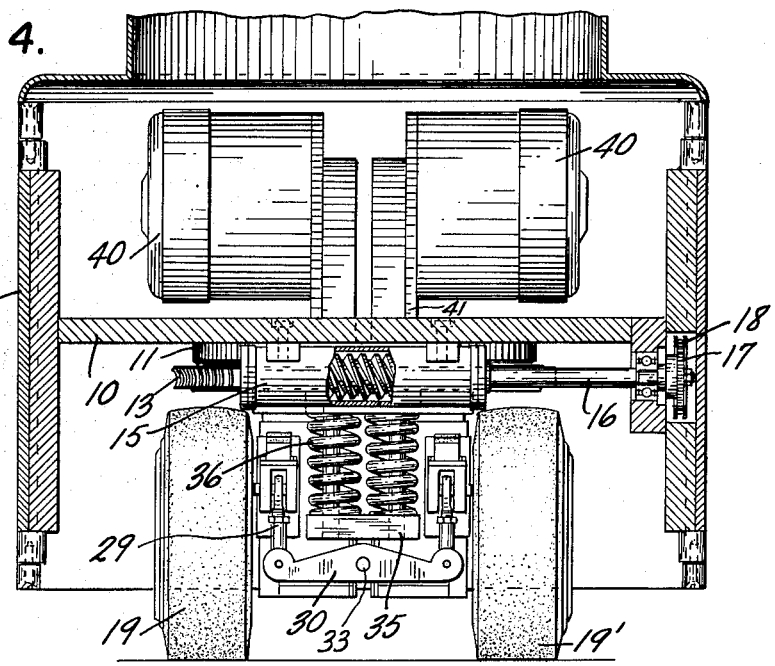
Figure 4 is a section on the line 4—4 of Figure 3, reduced in size.

The steering head is enclosed within the compartment 9 at the rear of the truck body. Extending horizontally across the interior of said compartment is a heavy plate 10 which is rigidly connected to the main frame of the truck within the compartment 1 and is connected to the side walls of compartment 9 as shown in Fig. 4. The said plate carries the outer race 11 of a bearing, the inner race 12 of which carries a worm ring 13 which meshes with worm 14 which rotates within a cylindrical casing 15 also carried on the plate 10. The worm 14 is rotated by a shaft 16 which extends horizontally to the side wall of the compartment where it is connected to a sprocket 17 over which runs a chain 18 which is connected to the steering shaft and operated by turning the steering wheel. As hereinafter explained, the pair of drive and steer wheels 19, 19', and their respective suspensions, drive motors and driving connections are all connected to said worm ring 13 and rotate therewith when the latter is rotated by operation of the steering wheel. As will be noted, the worm ring 13 is a complete ring extending through 360°, and the drive and steer wheels may, if desired, be rotated through 360°, although rotation through more than 180° is seldom required.

Since the wheels 19 and their respective suspensions and drive connections are identical, only one will be described in detail. Each of the wheels 19 is mounted on an axle 20 rotating in bearings 21, 22 in a housing 23, which said housing is rigidly connected to a rearwardly projecting arm 24 which is pivoted on pin 25 on the lower end of a strut 26 which is rigidly mounted on the bottom of the worm ring 13. Each of the housings 23 is also rigidly connected to a pair of forwardly projecting spaced, parallel plates 27, 27' spanned by a pin 28 on which pivots a turnbuckle link 29. Each of the links 29 is pivotally connected, in turn, to one end of the yoke 30 through a pin 31 which spans the bifurcated ends 32 of the yoke.

The yoke 30 is pivoted at its mid point to rock on a pin 33 which is carried in the downwardly projecting portion 34 of the springanchor block 35. A pair of relatively heavy coil compression springs 36 are mounted between the block 35 and block 37 which is rigidly mounted on the bottom of worm ring 13. The springs 36 are held in position by bolts 38 having their upper ends fixed in the block 37 and their lower ends passing loosely through block 35, thereby providing a lost motion connection permitting further compression of the springs under conditions of sudden shock as hereinafter explained. Nuts 39 on the lower ends of bolts 38 limit the expansion of the springs 36 and hold them under predetermined minimum compression. The predetermined minimum compression of the springs is sufficient to exert tension on the bolts 38 under maximum load conditions, but not under conditions of sudden shock as hereinafter explained.

Figure 2:
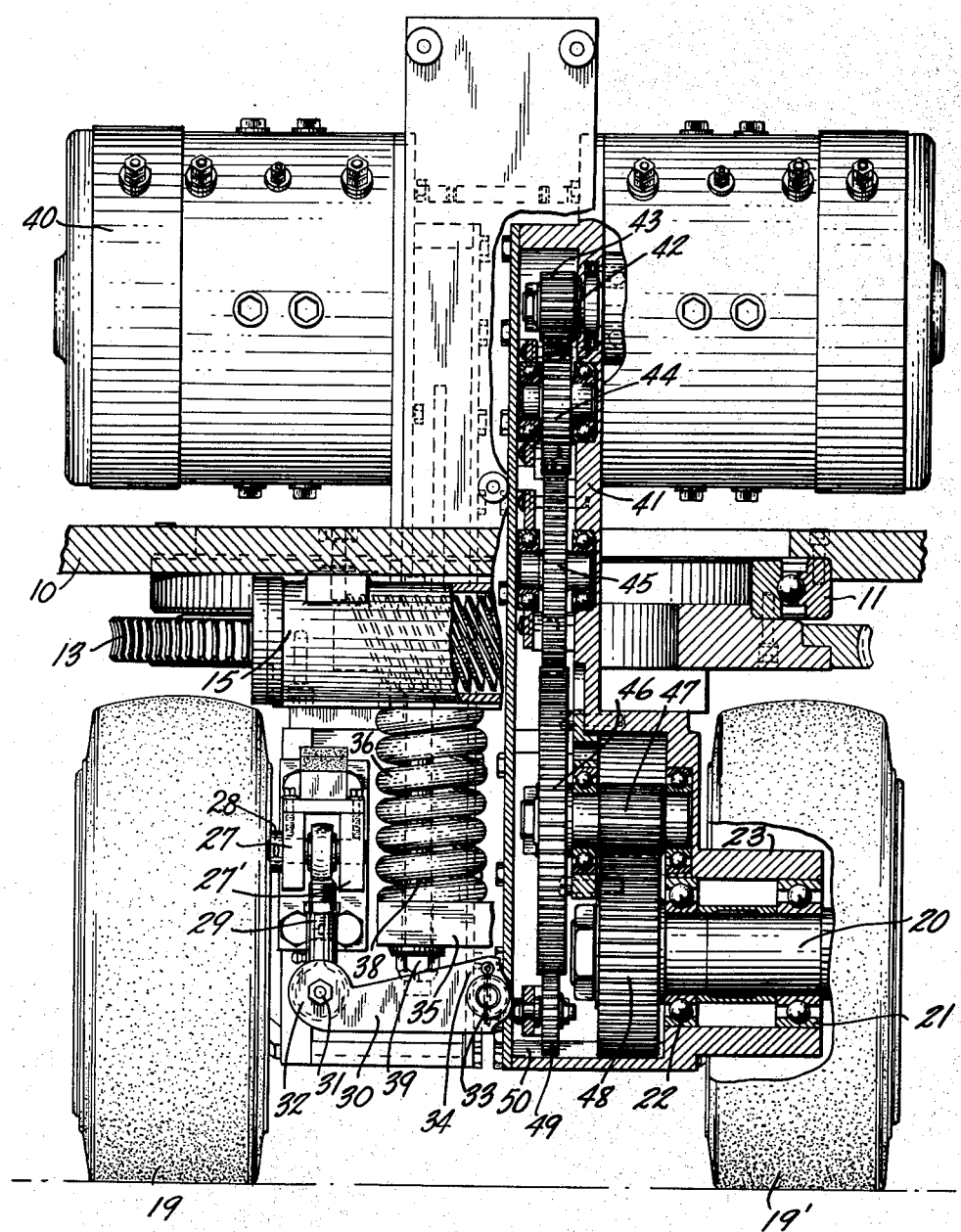
Figure 2 is a rear elevation of the steering head, partly in section.
Figure 3:
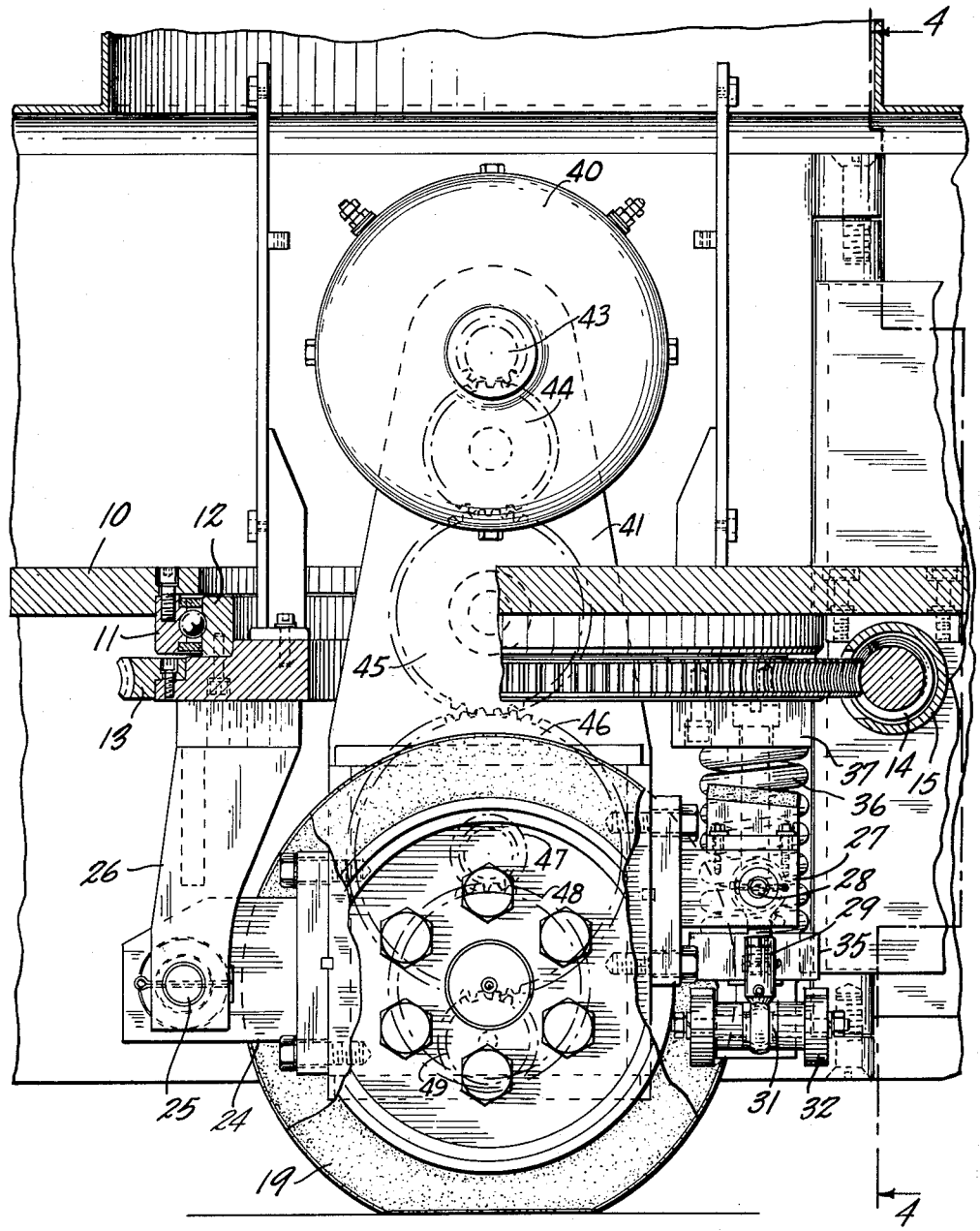
Figure 3 is a side elevation of the steering head, partly broken away.

Each of the wheels is driven independently by a motor 40 through a gear train which extends through a housing 41 which is integral with and forms an extension of the wheel bearing housing 23 previously referred to and extends upwardly through the ring gear 13 as shown in Figure 2. Thus the motors 40 are mounted on the housings 41 with their shafts 42 extending into the housing and each carrying a gear 43 which meshes with the first gear 44 of the train which includes gears 45, 46, 47 and finally gear 48 which is mounted on the wheel axle 20. The gear 49 is merely an idler gear which meshes with gear 46 which dips into the sump 50 at the bottom of the housing to carry lubricant to the gear train.

Figures 5, 6:
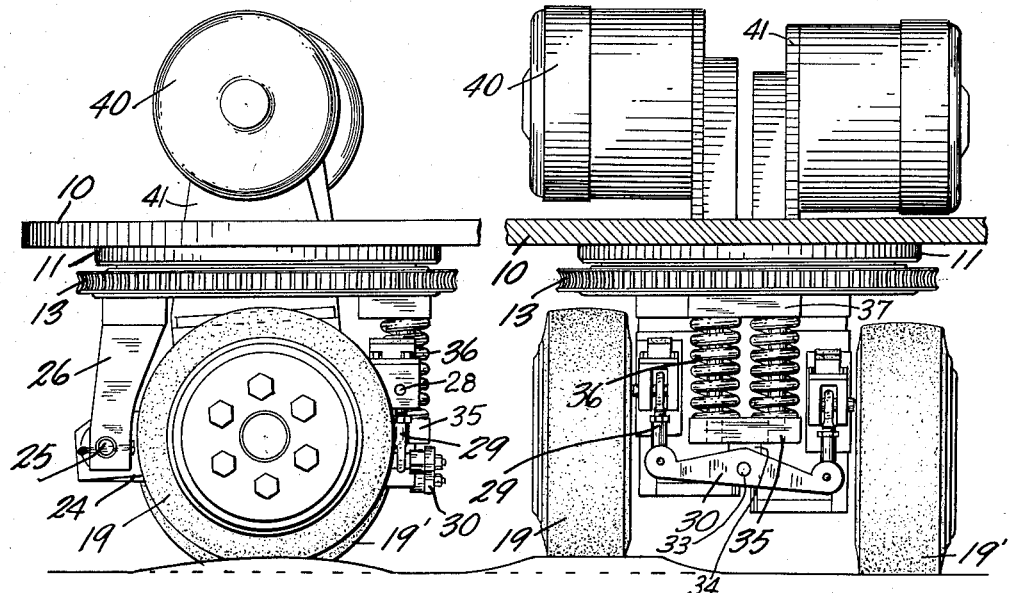
Figure 5 is a similar view showing the manner in which the wheel suspension accommodates itself to surface irregularities.
Figure 6 is a similar side view.

From the foregoing it will be noted that each of the drive and steer wheels 19 and its drive gear train, housings and drive motor constitutes a complete drive unit which forms part of a lever arm pivoted at 25 and connected through turnbuckle 29 with the end of pivoted yoke 30. Thus each entire unit swings as a unit on the pivot 25 when one of the wheels rides over an irregularity in surface as illustrated in Figs. 5 and 6. As there illustrated, this condition causes the yoke 30 to rock on the pin 33. At the same time the entire wheel unit including the wheel bearings 21, 22, bearing housing 23, gear train and gear housing 41, motor 40 and arm 24 tilt backwardly on pin 25, as shown in Fig. 6. During this rocking and tilting movement, however, it will be noted that the springs 36 are not further compressed, the tilting of the yoke and the lifting of the pivot pin 33 resulting merely in a corresponding lifting of the plate 10. Thus, the springs do not affect the action of the wheels as they encounter surface irregularities individually to cause articulation of the wheel suspension as illustrated in Figs. 5 and 6.

The function of the springs 36 is, therefore, to provide a resilient connection between the plate 10 and the drive and steer wheels. Since the load on the plate is transmitted through the yoke 30 to the wheels, however, it will be obvious that the load will be evenly divided between the wheels even when rolling over an irregular surface. In cases where both wheels may simultaneously encounter a steep rise or a deep depression such as to produce a condition of sudden shock, however, said springs serve to cushion the shock.

One of the important features of this construction, and particularly the arrangement of the compression springs 36, is that it permits the full mass of the drive units and wheels to be effective as counterweight to the load on the forks 2. In most spring mounted vehicles, the springs in the spring system react to the ground through the wheels. In such cases the mass of the unsprung parts between the ground and the spring system cannot act fully as counterweight until the load in the springs is dissipated and the wheels tend to leave the ground. In the present construction, on the contrary, the expansion of the springs 36 is limited and the forces of the springs 36 are contained by the tension bolts 38. The springs, therefore, do not react through the wheels to the ground except under shock conditions such as when the wheels encounter a steep rise or a deep depression as previously explained. Under ordinary conditions, therefore, the entire mass of the drive units, wheels and even the springs themselves acts as effective counterweight.

It will be understood that the invention may be variously modified and embodied within the scope of the subjoined claims.

We claim as our invention:

1. A power driven materials handling truck comprising a body, a pair of wheels supporting the front end of said body, a drive and steer unit supporting the rear end of said body, said drive and steer unit comprising a member mounted on said body for rotation on a vertical axis, a pair of drive and steer wheels, means for mounting each of said wheels for independent oscillating movement on said member, and a separate motor for driving each of said drive and steer wheels independently, each of said motors being mounted on a respective wheel mounting means to oscillate with the respective wheel.

2. A power driven materials handling truck comprising a body, a pair of wheels supporting the front end of said body, a drive and steer unit supporting the rear end of said body, said drive and steer unit comprising a member mounted on said body for rotation on a vertical axis, a pair of drive and steer wheels, means for mounting each of said wheels for independent oscillating movement on said member, and a separate motor for driving each of said drive and steer wheels independently, said means for mounting each of said wheels for independent oscillating movement on said member including a pair of levers each pivoted at one end on said member, with each of said levers carrying one of said wheels, a transverse yoke pivotally connected to the other end of each of said levers, and means for pivotally mounting said yoke on said member.

3. A power driven materials handling truck comprising a body, a pair of wheels supporting the front end of said body, a drive and steer unit supporting the rear end of said body, said drive and steer unit comprising a member mounted on said body for rotation on a vertical axis, a pair of drive and steer wheels, means for mounting each of said wheels for independent oscillating movement on said member, and a separate motor for driving each of said drive and steer wheels independently, said means for mounting each of said wheels for independent oscillating movement on said member comprising a pair of levers each pivoted at one end on said member, with each of said levers carrying one of said wheels, a transverse yoke pivotally connected to the other end of each of said levers, and means for pivotally mounting said yoke on said member, said means including a compression spring between said yoke and said member.

4. A power driven materials handling truck comprising a body, a pair of wheels supporting the front end of said body, a drive and steer unit supporting the rear end of said body, said drive and steer unit comprising a member mounted on said body for rotation on a vertical axis, a pair of drive and steer wheels, means for mounting each of said wheels for independent oscillating movement on said member, and a separate motor for driving each of said drive and steer wheels independently, said means for mounting each of said wheels for independent oscillating movement on said member comprising a pair of levers each pivoted at one end on said member, with each of said levers carrying one of said wheels, a transverse yoke pivotally connected to the other end of each of said levers, and means for pivotally mounting said yoke on said member, said means including a compression spring between said yoke and said member and means for limiting the expansion of said spring and holding it under predetermined compression.

5. A power driven materials handling truck comprising a body, a pair of wheels supporting the front end of said body, a drive and steer unit supporting the rear end of said body, said drive and steer unit comprising a member mounted on said body for rotation on a vertical axis, a pair of drive and steer wheels, means for mounting each of said wheels for independent oscillating movement on said member, a separate motor for driving each of said drive and steer wheels independently, each of said motors being mounted on a respective wheel mounting means to oscillate with the respective wheel, and means for cushioning said body from sudden shocks imposed on both of said drive and steer wheels simultaneously comprising a compression spring between said member and said wheels and means for limiting the expansion of said spring and holding it under a predetermined compression.

References Cited in the file of this patent

UNITED STATES PATENTS

| | | |
|---|---|---|
| 1,001,837 | Fuller | Aug. 29, 1911 |
| 1,313,217 | Jackson | Aug. 12, 1919 |
| 1,461,735 | Peters | July 17, 1923 |
| 1,593,194 | Scott | July 20, 1926 |
| 2,232,972 | Ronning | Feb. 25, 1941 |
| 2,273,630 | | |
| 2,284,237 | | |
| 2,299,150 | | |
| 2,320,600 | | |
| 2,362,636 | | |
| | Dunham | Feb. 17, 1942 |
| | Stevenson | May 26, 1942 |
| | Kennedy | Oct. 20, 1942 |
| | Howell | June 1, 1943 |
| | Joy | Nov. 14, 1944 |

FOREIGN PATENTS

| | | |
|---|---|---|
| 112,609 | Australia | Feb. 24, 1941 |
| 931,815 | Germany | Aug. 18, 1955 |
| 22,478 of 1912 | Great Britain | Oct. 3, 1913 |